(12) United States Patent
Ashikhmin et al.

(10) Patent No.: US 8,498,408 B2
(45) Date of Patent: Jul. 30, 2013

(54) CROSSTALK ESTIMATION AND POWER SETTING BASED ON INTERPOLATION IN A MULTI-CHANNEL COMMUNICATION SYSTEM

(75) Inventors: Alexei E. Ashikhmin, Morristown, NJ (US); Philip Alfred Whiting, New Providence, NJ (US)

(73) Assignee: Alcatel Lucent, Paris (FR)

( * ) Notice: Subject to any disclaimer, the term of this patent is extended or adjusted under 35 U.S.C. 154(b) by 721 days.

(21) Appl. No.: 12/493,328

(22) Filed: Jun. 29, 2009

(65) Prior Publication Data

US 2010/0329444 A1    Dec. 30, 2010

(51) Int. Cl.
*H04M 9/00* (2006.01)
*H04M 1/76* (2006.01)
*H04M 7/00* (2006.01)

(52) U.S. Cl.
USPC .......................................................... 379/417

(58) Field of Classification Search
USPC ................. 379/392.01, 406.06, 417; 370/201
See application file for complete search history.

(56) References Cited

U.S. PATENT DOCUMENTS

| 6,693,992 | B2 | 2/2004 | Jones et al. | |
|---|---|---|---|---|
| 6,829,293 | B2 | 12/2004 | Jones et al. | |
| 6,985,521 | B1 | 1/2006 | Rezvani et al. | |
| 7,676,007 | B1 * | 3/2010 | Choi et al. | 375/347 |

OTHER PUBLICATIONS

Jerome Louveaux and Alle-Jan van der Veen, Adaptive DSL Crosstalk Precancellation Design Using Low-Rate Feedback from End Users, 13 IEEE Signal Processing Letters, No. 11, 665 (Nov. 2006).*
A. Rashdi and N.M. Sheikh, A Centralized DSM Algorithm for Multiuser Digital Subscriber Line Systems, 2007 Int'l Conf. on Elec. Eng'g (April).*
X. Hou et al., "A Time-Domain Approach for Channel Estimation in MIMO-OFDM-Based Wireless Networks," IEICE Trans. Commun., Jan. 2005, pp. 3-9, vol. E88-B, No. 1.
ITU Recommendation, COM 15-C 177-E, "G.vds12: Pilot Sequence Assisted Vector Channel Estimation," Study Group 15—Contribution 177, Upzide Labs, pp. 1-6, Oct. 2006.
ITU Recommendation, COM 15-C 685-E, "G.vector: Advantages of Using a Startup Sequence for Joining Event," Study Group 15—Contribution 685, Infineon Technologies North American, pp. 1-3, Jan. 2008.
U.S. Appl. No. 12/352,896 filed in the name of A. Ashikhmin et al. on Jan. 13, 2009 and entitled "Power Control Using Denoised Crosstalk Estimates in a Multi-Channel Communication System."

(Continued)

*Primary Examiner* — Alexander Jamal
(74) *Attorney, Agent, or Firm* — Ryan, Mason & Lewis, LLP

(57) ABSTRACT

An access node of a communication system comprises a plurality of transmitters adapted for communication with at least one receiver over a plurality of channels. The access node is operative to obtain estimated crosstalk coefficients between a joining channel and an active channel, and to set a power level of at least one signal transmitted over the joining channel based on the estimated crosstalk coefficients. The access node obtains the estimated crosstalk coefficients by first obtaining a subset of the estimated crosstalk coefficients and subsequently determining additional ones of the estimated crosstalk coefficients by applying an interpolation process to the estimated crosstalk coefficients in the subset. The access node sets the power level of the signal transmitted over the joining channel in a manner that ensures maintenance of a desired performance characteristic for the active channel.

21 Claims, 5 Drawing Sheets

OTHER PUBLICATIONS

U.S. Appl. No. 12/060,653 filed in the name of A. Ashikhmin et al. on Apr. 1, 2008 and entitled "Fast Seamless Joining of Channels in a Multi-Channel Communication System."

U.S. Appl. No. 12/370,148 filed in the name of G. Kramer et al. on Feb. 12, 2009 and entitled "Simultaneous Estimation of Multiple Channel Coefficients Using a Common Probing Sequence."

* cited by examiner

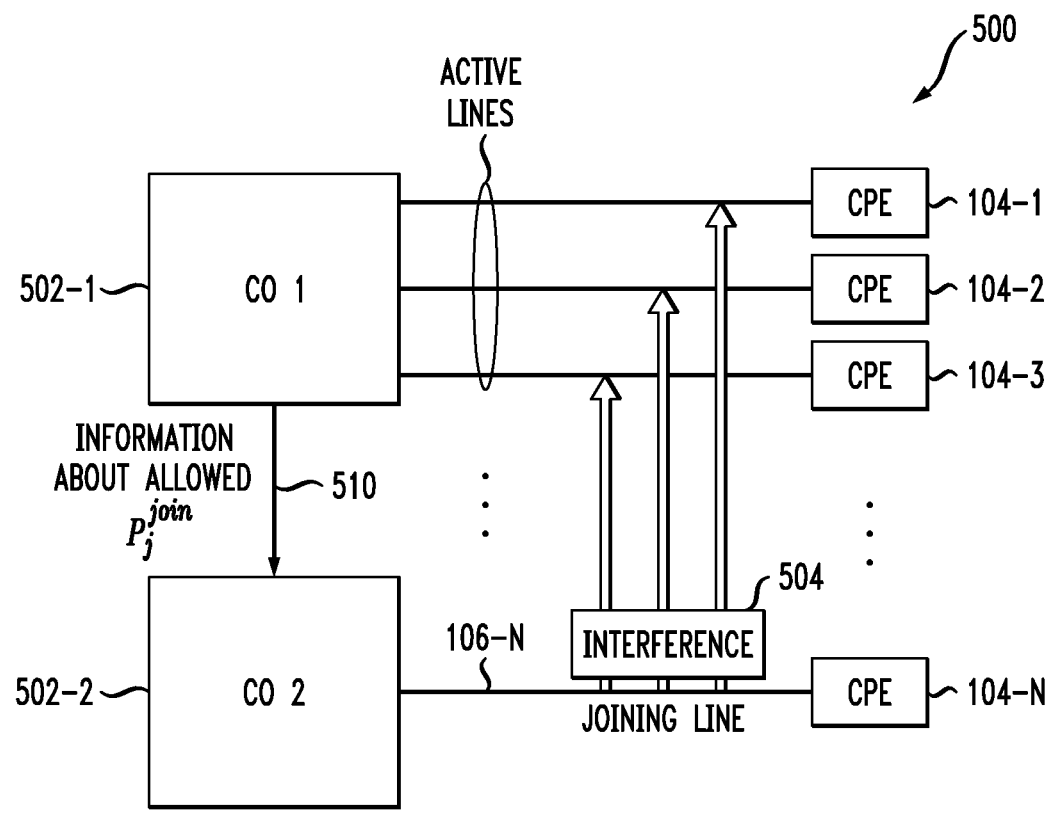

CROSSTALK ESTIMATION AND POWER SETTING BASED ON INTERPOLATION IN A MULTI-CHANNEL COMMUNICATION SYSTEM

FIELD OF THE INVENTION

The present invention relates generally to communication systems, and more particularly to techniques for controlling crosstalk between communication channels in such systems.

BACKGROUND OF THE INVENTION

As is well known, a communication system may utilize multiple communication channels to communicate signals between transmitters and receivers of the system. For example, multiple channels may be used to separate different transmitted data signals from one another, or to provide an increased data rate.

A problem that can arise in multiple channel communication systems relates to crosstalk between the various channels, also referred to as inter-channel crosstalk. For example, digital subscriber line (DSL) broadband access systems typically employ discrete multi-tone (DMT) modulation over twisted-pair copper wires. One of the major impairments in such systems is crosstalk between multiple subscriber lines within the same binder or across binders. Thus, a transmission on one subscriber line may be detected on other subscriber lines, leading to interference that can degrade the throughput performance of the system. More generally, a given "victim" channel may experience crosstalk from multiple "disturber" channels, again leading to undesirable interference.

Dynamic spectrum management (DSM) techniques have been developed in order to combat interference and to maximize the effective throughput and reach of a DSL system. Lower level DSM techniques, commonly referred to as Level 1 and Level 2 techniques, generally adjust the power levels associated with a given subscriber line in an attempt to minimize interference. Level 3 techniques are more sophisticated, and allow active cancellation of inter-channel crosstalk through the use of a precoder. The precoder is typically used to achieve crosstalk cancellation for downstream communications between a central office (CO) and customer premises equipment (CPE). It is also possible to implement crosstalk control for upstream communications from the CPE to the CO, using so-called post-compensation techniques.

One known approach to estimating crosstalk coefficients for downstream power control or crosstalk cancellation in a DSL system involves transmitting distinct pilot signals over respective subscriber lines between a CO and respective CPE of the system. Error feedback from the CPE based on the transmitted pilot signals is then used to estimate crosstalk. Other known approaches involve perturbation of precoder coefficients and feedback of signal-to-noise ratio (SNR) or other interference information.

Crosstalk estimates are commonly utilized in situations in which it is necessary to "join" an additional line to a group of active lines in a DSL system. For example, it may become necessary to activate one or more inactive lines in a synchronization group that already includes multiple active lines. Such joining of an additional line may require that the power control or precoder be adjusted accordingly in order to optimize system performance.

Crosstalk estimates are also used in a variety of other line management applications, including determining whether or not to precode, and setting power levels on victim and disturber lines.

Accordingly, it is important to have accurate crosstalk estimates that can be generated quickly and efficiently.

SUMMARY OF THE INVENTION

The present invention in one or more illustrative embodiments provides techniques for estimation of crosstalk coefficients using linear-model interpolation and for utilizing such estimates in power control and preceding applications.

In accordance with one aspect of the invention, an access node of a communication system comprises a plurality of transmitters adapted for communication with at least one receiver. The access node may comprise, for example, at least a portion of at least one CO of a DSL communication system. The access node is operative to obtain estimated crosstalk coefficients between a joining channel and an active channel, and to set a power level of at least one signal transmitted over the joining channel based on the estimated crosstalk coefficients. The access node obtains the estimated crosstalk coefficients by first obtaining a subset of the estimated crosstalk coefficients and subsequently determining additional ones of the estimated crosstalk coefficients by applying an interpolation process to the estimated crosstalk coefficients in the subset. The access node sets the power level of the signal transmitted over the joining channel in a manner that ensures maintenance of a desired performance characteristic for the active channel.

In an illustrative embodiment, the active channel and the joining channel comprise respective active and joining lines of a DSL system, with each line comprising M tones. The subset of estimated crosstalk coefficients in such an embodiment may comprise crosstalk coefficients for a subset $\{0, 2\Omega, 4\Omega, \ldots, (L/2-1)2\Omega\}$ of the M tones, where $L=M/\Omega$ the subset thereby providing a vector of estimated crosstalk coefficients given by $\hat{h}_{2\Omega}=(\hat{h}_0, \hat{h}_{2\Omega}, \hat{h}_{4\Omega}, \ldots \hat{h}_{(L/2-1)2\Omega})$. Other subsets may also be used. For example, the subset of estimated crosstalk coefficients may comprise crosstalk coefficients for a subset $\{0, \Omega, 2\Omega, \ldots, (L-1)\Omega\}$ of the M tones, such that the subset provides a vector of estimated crosstalk coefficients given by $\hat{h}_{\Omega}=(\hat{h}_0, \hat{h}_{\Omega}, \hat{h}_{2\Omega}, \ldots \hat{h}_{(L-1)\Omega})$.

By way of example, the interpolation process may comprise a linear-model interpolation process given by:

$$h^{int}=A_{2\Omega}\hat{h}_{2\Omega},$$

where $h^{int}=(h_0^{int}, h_1^{int}, \ldots h_{M-1}^{int})$ is a vector comprising the estimated crosstalk coefficients for respective ones of the M tones, $\hat{h}_{2\Omega}=(\hat{h}_0, \hat{h}_{2\Omega}, \hat{h}_{4\Omega}, \ldots \hat{h}_{(L/2-1)2\Omega})$ is the vector of estimated crosstalk coefficients in the subset, and $A_{2\Omega}$ is an $M\times(L/2)$ matrix.

The setting of a power level based on the estimated crosstalk coefficients may comprise, for example, assigning power levels $P_0^{join}, P_1^{join}, \ldots, P_{M-1}^{join}$ to respective ones of M tones of the joining line. More specifically, the power levels may be assigned to the tones of the joining line such that if a given one of the estimated crosstalk coefficients $\hat{h}_j$ obtained by application of the interpolation process is utilized for precoding of the active line, then interference in the j-th tone of the active line from the joining line will exceed a designated level only with a negligibly small probability. Control of the probability of excessive interference stems from knowledge of the error variance, which may be inferred using well-known statistical methods, or alternatively computed or bounded.

Advantageously, the illustrative embodiments allow crosstalk estimates to be obtained much more quickly than would otherwise be possible, resulting in enhanced speed of operation within the system as well as minimal impact on active lines of the system. For example, a given line can be joined to a group of active lines in substantially less time than would otherwise be required, while also ensuring that specified levels of performance are maintained in the respective active lines.

These and other features and advantages of the present invention will become more apparent from the accompanying drawings and the following detailed description.

BRIEF DESCRIPTION OF THE DRAWINGS

FIG. 5 is a block diagram of a multi-channel communication system in another illustrative embodiment of the invention.

DETAILED DESCRIPTION OF THE INVENTION

The present invention will be illustrated herein in conjunction with exemplary communication systems and associated techniques for obtaining crosstalk estimates in such systems. The crosstalk estimates may be used in conjunction with joining subscriber lines or other communication channels to a group of active channels in such systems, or for other line management functions. It should be understood, however, that the invention is not limited to use with the particular types of communication systems and channel estimation applications disclosed. The invention can be implemented in a wide variety of other communication systems, using alternative techniques for obtaining channel coefficient estimates, and in numerous alternative applications involving the use of such estimates. For example, although illustrated in the context of DSL systems based on DMT modulation, the disclosed techniques can be adapted in a straightforward manner to a variety of other types of wired or wireless communication systems, including cellular systems, multiple-input multiple-output (MIMO) systems, Wi-Fi or WiMax systems, etc. The techniques are thus applicable to other types of orthogonal frequency division multiplexing (OFDM) systems outside of the DSL context.

Figure 1:
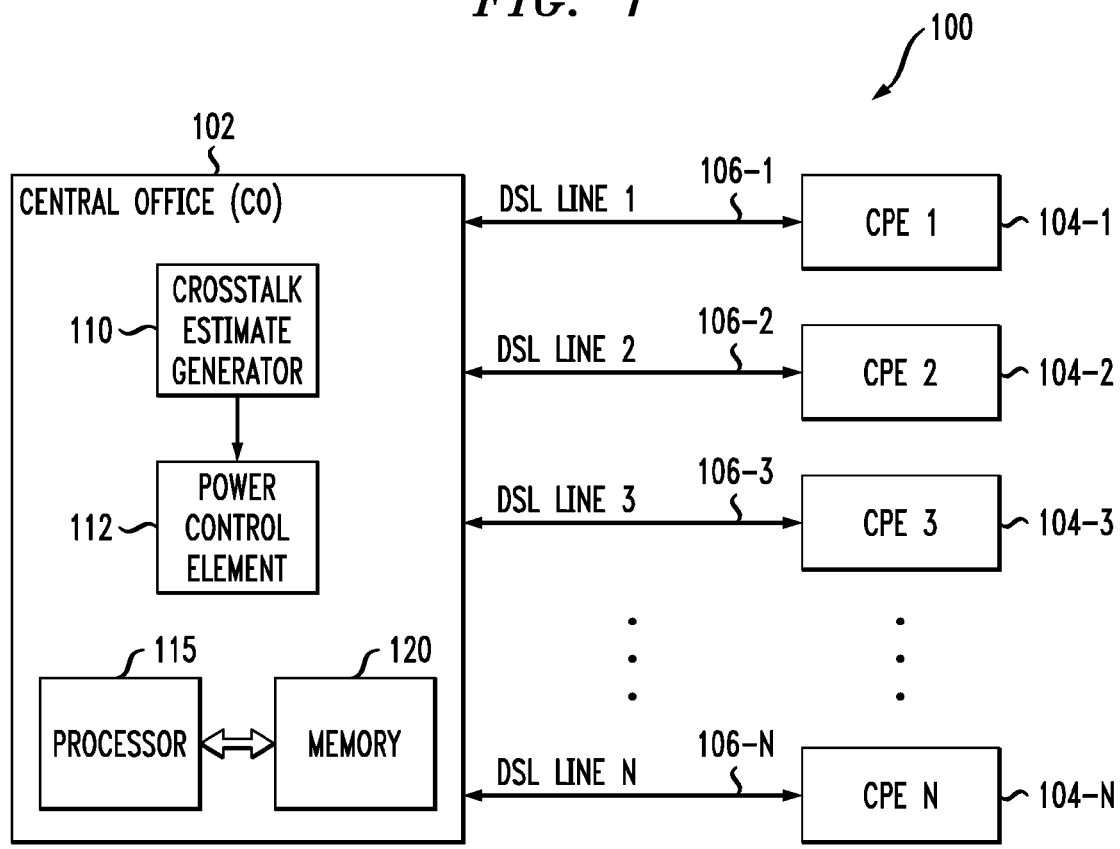
FIG. 1 is a block diagram of a multi-channel communication system in an illustrative embodiment of the invention.

FIG. 1 shows a communication system 100 comprising a central office (CO) 102 and customer premises equipment (CPE) 104. The CPE 104 more particularly comprises N distinct CPE elements that are individually denoted CPE 1, CPE 2, . . . CPE N, and are further identified by respective reference numerals 104-1, 104-2, . . . 104-N as shown. A given CPE element may comprise, by way of example, a modem, a computer, or other type of communication device, or combinations of such devices. The CO 102 is coupled to these CPE elements via respective subscriber lines denoted Line 1, Line 2, . . . Line N, each of which may comprise, for example, a twisted-pair copper wire connection.

In an illustrative embodiment, fewer than all of the N lines 106-1 through 106-N are initially active lines, and at least one of the N lines is a "joining line" that is to be activated and joined to an existing group of active lines. The initially active lines are an example of what is referred to herein as a "group" of active lines. Such a group may be, for example, a synchronization group, which may also be referred to as a preceding group, or any other type of grouping of active lines.

Communications between the CO 102 and the CPE 104 include both downstream and upstream communications for each of the active lines. The downstream direction refers to the direction from CO to CPE, and the upstream direction is the direction from CPE to CO. Although not explicitly shown in FIG. 1, it is assumed without limitation that there is associated with each of the subscriber lines of system 100 a CO transmitter and a CPE receiver for use in communicating in the downstream direction, and a CPE transmitter and a CO receiver for use in communicating in the upstream direction. The corresponding transmitter and receiver circuitry can be implemented in the CO and CPE using well-known conventional techniques, and such techniques will not be described in detail herein.

The CO 102 in the present embodiment comprises a crosstalk estimate generator 110 coupled to a power control element 112. The CO utilizes the crosstalk estimate generator to obtain crosstalk estimates for respective ones of at least a subset of the lines 106. The power control element 112 is used to adjust power levels of signals transmitted over one or more of the lines based on the crosstalk estimates. Power control in this context may therefore involve, for example, gradual ramping up or stepping up of power levels when a line is joining and its crosstalk coefficients are gradually being acquired. As another example, interpolated crosstalk estimates obtained in the manner disclosed herein can also be used to set the transmit power levels of the joining line in accordance with the above-noted Level 2 DSM techniques. More particularly, under this Level 2 DSM approach, power is reduced on one line which reduces its rate but also its interference, thereby allowing other lines to have higher rates. These and other techniques for power control are examples of arrangements that involve setting a power level of at least one signal transmitted over a joining channel.

It should be understood that power control is just one illustrative example of an application in which the crosstalk estimates generated in CO 102 can be utilized. Other applications include, for example, pre-compensation of downstream signals transmitted from the CO to the CPE, and post-compensation of upstream signals received in the CO from the CPE. Pre-compensation techniques may be implemented using a precoder, an example of which will be described in conjunction with FIG. 2. More generally, crosstalk estimates generated in the manner described herein can be utilized in any application involving coordinating signals sent from multiple transmitters in order to improve system performance by increasing data rates, reducing errors, etc.

The crosstalk estimate generator 110 may be configured to generate crosstalk estimates from error samples, SNR values or other types of measurements fed back to the CO 102 from the CPE 104. It should be noted that the term SNR as used herein is intended to be broadly construed so as to encompass other similar measures, such as the signal-to-interference-plus-noise ratios (SINRs) that are utilized in certain techniques disclosed herein. Examples of particular techniques for generating crosstalk estimates in the crosstalk estimate generator of the CO will be described in detail below.

In other embodiments, crosstalk estimates may be generated outside of the CO 102 and supplied to the CO for further processing. For example, such estimates may be generated in the CPE 104 and returned to the CO for use in power control, preceding, post-compensation or other applications.

A crosstalk estimate is an example of what is more generally referred to herein as a "channel coefficient estimate," an "estimated channel coefficient," or simply a "channel estimate."

The crosstalk estimate generator 110 may incorporate denoising functionality for generating denoised crosstalk estimates. Examples of crosstalk estimate denoising techniques suitable for use with embodiments of the invention are described in U.S. patent application Ser. No. 12/352,896, filed Jan. 13, 2009 and entitled "Power Control Using Denoised Crosstalk Estimates in a Multi-Channel Communication System," which is commonly assigned herewith and incorporated by reference herein. It is to be appreciated, however, that the present invention does not require the use of any particular denoising techniques. Illustrative embodiments to be described herein may incorporate denoising functionality using frequency filters as part of a channel coefficient estimation process.

As will be described in greater detail below, the CO 102 is configured to implement a technique for channel estimation using linear-model interpolation.

In implementing such a technique, the CO transmits the pilot signals over respective ones of the lines 106. Corresponding measurements such as error samples or SNR values are fed back from the CPE to the CO and utilized to generate crosstalk estimates in crosstalk estimate generator 110. The CO then adjusts power levels, performs preceding or otherwise controls data signal transmission based on the crosstalk estimates.

The CO 102 further comprises a processor 115 coupled to a memory 120. The memory may be used to store one or more software programs that are executed by the processor to implement the functionality described herein. For example, functionality associated with crosstalk estimate generator 110 and power control element 112 may be implemented at least in part in the form of such software programs. The memory is an example of what is more generally referred to herein as a computer-readable storage medium that stores executable program code. Other examples of computer-readable storage media may include disks or other types of magnetic or optical media.

The CO 102 or a portion thereof may be viewed as an example of what is more generally referred to herein as an "access node" of a communication system. A single access node may, but need not, comprise multiple COs or portions of one or more COs. Another example of a possible access node is a DSL access multiplexer (DSLAM). Thus, the term "access node" as used herein is intended to be broadly construed so as to encompass, for example, a particular element within a CO, such as a DSLAM, or the CO itself, as well as other types of access point elements in systems that do not include a CO.

In the illustrative embodiment of FIG. 1 the lines 106 are all associated with the same CO 102 which may comprise a single access node. However, in other embodiments, these lines may be distributed across multiple access nodes. Different ones of such multiple access nodes may be from different vendors. For example, it is well known that in conventional systems, several access nodes of distinct vendors can be connected to the same bundle of DSL lines. Under these and other conditions, the various access nodes may have to interact with one another in order to achieve optimal interference cancellation.

The terms "customer premises equipment" or CPE should be construed generally as including other types of user equipment in the context of non-DSL systems.

An implementation of the system 100 of FIG. 1 that includes a precoder will be described below with reference to FIG. 2. Such a precoder is used for active crosstalk cancellation for downstream communications between the CO 102 and CPE 104. However, it should be emphasized that the disclosed techniques can be adapted in a straightforward manner for use in controlling crosstalk for upstream communications. Furthermore, the techniques are applicable to systems involving symmetric communications in which there is no particular defined downstream or upstream direction.

Figure 2:
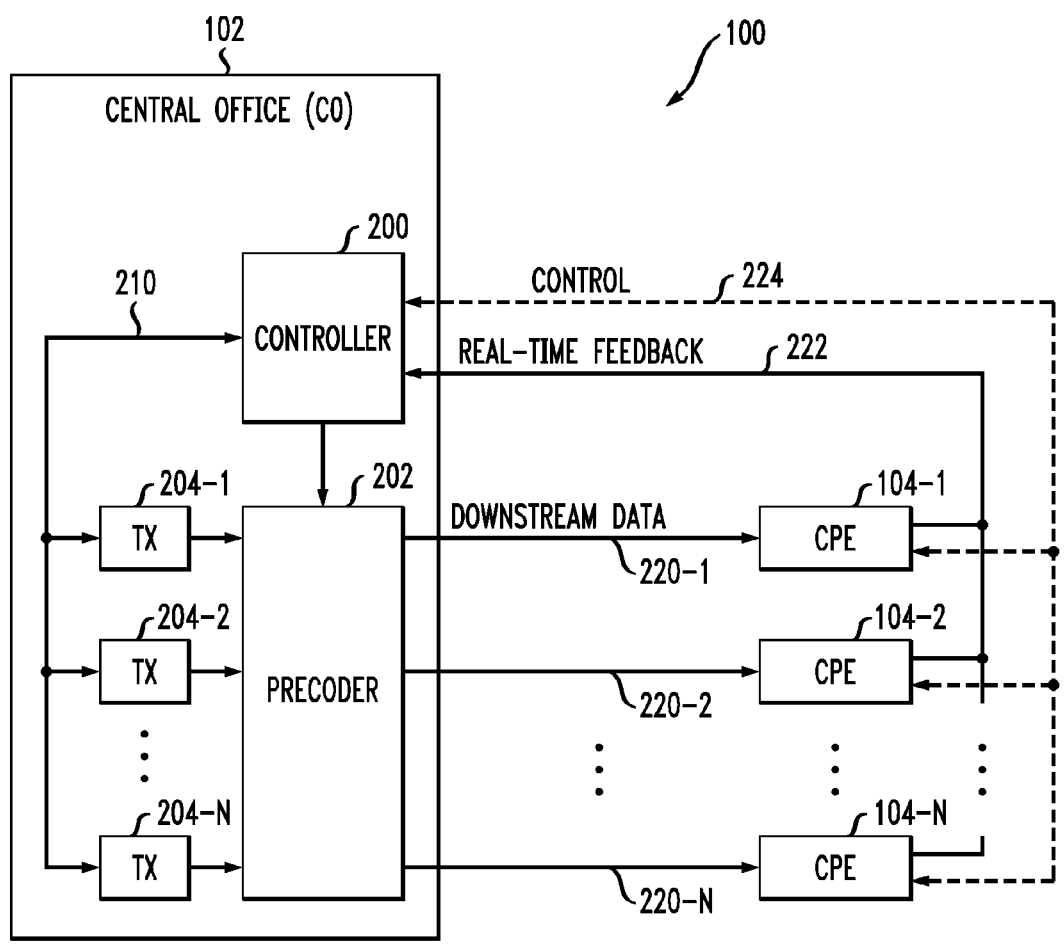
FIG. 2 shows a more detailed view of one possible implementation of the FIG. 1 system.

Referring now to FIG. 2, the CO 102 is shown in this particular implementation as including a controller 200, a precoder 202, and a set of N transmitters denoted 204-1 through 204-N. The controller is coupled to the precoder and the transmitters for controlling the transmission of downstream signals in system 100. The transmitters generate respective streams of DMT symbols that are transmitted over downstream data paths 220-1 through 220-N to respective CPE 104-1 through 104-N. The precoder 202 utilizes crosstalk estimates to adjust the downstream signals prior to transmission in a manner that tends to cancel out the crosstalk introduced in traversing the downstream data paths. Any of a wide variety of known preceding techniques may be used to implement crosstalk cancellation for multiple joining and active lines of the type described herein. Such preceding techniques are well understood by those skilled in the art and therefore will not be described in detail.

The downstream data paths 220 shown in FIG. 2 represent downstream signal paths of the respective DSL lines 106 shown in FIG. 1. The system 100 also includes real-time feedback signal paths 222, which may be upstream signal paths of respective active ones of the DSL lines 106 shown in FIG. 1. It should be noted that a joining line may not have such a real-time feedback signal path until such time as the line is joined to the group and becomes fully active, although in other embodiments a joining line could, for example, be provided with a real-time feedback signal path during an initialization mode. The controller 200 supplies control signals to the CPE via control signal paths 224, which may represent, for example, one or more designated and otherwise conventional control channels within the DSL lines 106.

It should be noted that the controller 200 and precoder 202 may be implemented in whole or in part using the processor 115 of FIG. 1. For example, portions of the functionality associated with the elements 200 and 202 may be implemented in the form of software running on processor 115.

Also, although shown as separate elements in this illustrative embodiment for simplicity and clarity, precoder 202 and transmitters 204 may be combined, such that, for example, the preceding functionality associated with each downstream data path 220 is incorporated into its associated transmitter. The precoder 202 may therefore be viewed as comprising part of the transmitters 204, or may be arranged to precede the transmitters rather than to follow the transmitters as is illustratively shown in the figure.

Each of the CPE 104 may be configurable into multiple modes of operation responsive to control signals supplied by the CO 102 over control signal paths 224, as described in U.S. patent application Ser. No. 12/060,653, filed Apr. 1, 2008 and entitled "Fast Seamless Joining of Channels in a Multi-Channel Communication System," which is commonly assigned herewith and incorporated by reference herein. Such modes of operation may include, for example, a joining mode and a tracking mode. However, this type of multiple mode operation is not a requirement of the present invention.

Illustrative embodiments of the invention will be described herein with reference to DMT tones. However, the term "tone" as used herein is intended to be broadly construed so as to encompass not only DMT tones but also other types of sub-carriers of other multi-carrier communication systems.

It is assumed for illustrative purposes only that downstream transmission over each of the N channels 106 in the system 100 is implemented using DMT modulation with M tones per channel. The nature of the channel from one transmitter to one receiver on a particular tone can be described by a complex coefficient.

As indicated previously, the CO 102 in the system 100 is advantageously configured to obtain crosstalk estimates using a linear-model interpolation approach, as will now be described in greater detail. The use of such crosstalk estimates will be illustrated in the context of a given line joining a group of active lines, but it should be understood that the crosstalk estimates can be adapted for use in other types of line management applications, such as determining whether or not to precode, and setting power levels on victim and disturber lines.

The crosstalk from a disturber line into a victim line can be represented by a single complex vector h which has as many components as there are DMT tones. For example, a given implementation of the system 100 may utilize 4096 DMT tones, in which case h would include 4096 components, one for each tone. Each component may be viewed as comprising a coefficient, also referred to herein as a crosstalk channel coefficient.

Figure 3:
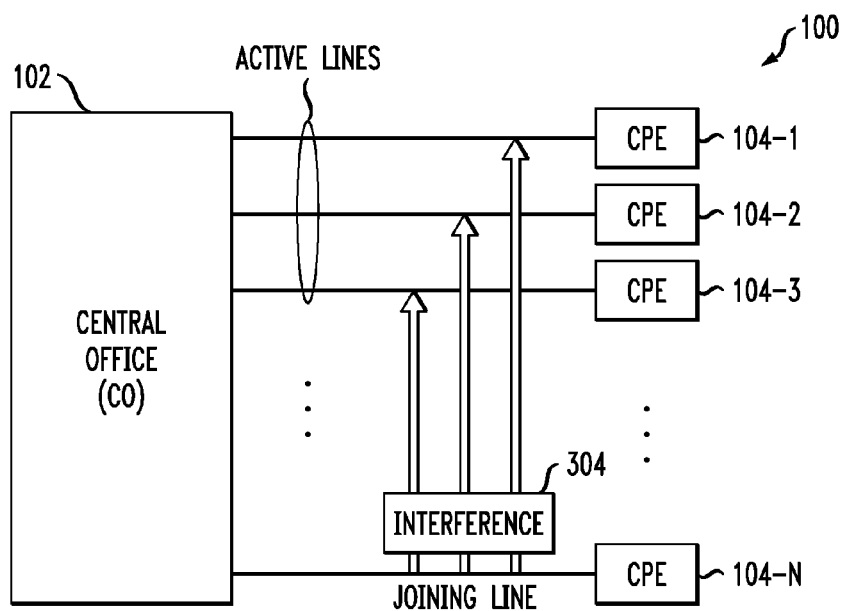
FIG. 3 illustrates crosstalk between a joining line and multiple active lines in an illustrative embodiment of the invention.

FIG. 3 illustrates an example of a joining arrangement involving the N lines 106 previously described in conjunction with FIGS. 1 and 2. In this example, lines 1, . . . , N−1 collectively form a group of active lines and line N is a new joining line. It is assumed that the crosstalk channel coefficients between the active lines are known and that the precoder 202 is utilizing these coefficients to suppress the interference between the active lines. It is desired to obtain estimates of the crosstalk channel coefficients between the joining line and each of the active lines so that the precoder 202 can utilize these estimates to significantly reduce interference 304 between the joining line and the active lines.

In the present embodiment, the crosstalk channel coefficients between the joining line and the set of active lines in FIG. 3 are determined using linear-model interpolation. These coefficients are then used to determine maximum power levels that can be used for the tones of the joining line while ensuring only limited interference with the active lines.

In order to simplify the notation it will initially be assumed that there is only one active line, with the crosstalk channel coefficients between the joining and active lines in tones 0 . . . M−1 being given by $h_0, h_1, h_2, \ldots, h_{M-1}$. It should be appreciated, however, that the disclosed techniques can be extended in a straightforward manner to the case of multiple active lines as in the arrangement shown in FIG. 3.

In the present embodiment, the crosstalk channel coefficients are initially estimated for a particular subset of the M tones. More particularly, we estimate the crosstalk channel coefficients on the tones $\{0, 2\Omega, 4\Omega, \ldots, (L/2-1)2\Omega\}$, $L=M/\Omega$ resulting in a vector of estimates $\hat{h}_{2\Omega}=(\hat{h}_0, \hat{h}_{2\Omega}, \hat{h}_{4\Omega}, \ldots \hat{h}_{(L/2-1)2\Omega})$.

It is assumed that the noise variances $N_0, N_{2\Omega}, N_{4\Omega}, \ldots, N_{(L/2-1)2\Omega}$ of the corresponding estimates are known. The noise variances $N_0, N_{2\Omega}, N_{4\Omega}, \ldots, N_{(L/2-1)2\Omega}$ depend on the number, K, of OFDM symbols used to generate the estimates, with larger values of K leading to smaller noise variances $N_0$, $N_{2\Omega}, N_{4\Omega}, \ldots N_{(L/2-1)2\Omega}$. Additional description of the noise variances $N_0, N_{2\Omega}, N_{4\Omega}, \ldots, N_{(L/2-1)2\Omega}$ will be provided below.

Obtaining the estimates $(\hat{h}_0, \hat{h}_{2\Omega}, \hat{h}_{4\Omega}, \ldots \hat{h}_{(L/2-1)2\Omega})$ does not significantly impact the active lines. For example, information transmission can be temporarily suspended in the active lines at tones $0, 2\Omega, 4\Omega, \ldots, (L/2-1)2\Omega, L=M/\Omega$ while the estimates are obtained. If L is small, the resulting temporary drops in the active line rates will be insignificant. Alternatively, the value L can be chosen such that forward error correction codes used in the active lines will be capable of correcting the interference created in the tones $0, 2\Omega, 4\Omega, \ldots, (L/2-1)2\Omega$ by the joining line during estimation of the coefficients $(\hat{h}_0, \hat{h}_{2\Omega}, \hat{h}_{4\Omega}, \ldots \hat{h}(L/2-1)2\Omega)$. It is also possible for the codes to compensate for erasures if the signal is not sent or is ignored on these tones. In either case, no loss of rate is entailed.

The above-noted linear-model interpolation is then utilized to obtain crosstalk channel coefficients for all of the M tones from the subset of estimates $(\hat{h}_0, \hat{h}_{2\Omega}, \hat{h}_{4\Omega}, \ldots \hat{h}_{(L/2-1)2\Omega})$. More particularly, we obtain an estimate $h^{int}=(h_0^{int}, h_1^{int}, \ldots, h_{M-1}^{int})$ of the vector $h=(h_0, h_1, h_{M-1})$ using linear-model interpolation as follows:

$$h^{int} = A_{2\Omega}\hat{h}_{2\Omega},$$

where $\hat{h}_{2\Omega}=(\hat{h}_0, \hat{h}_{2\Omega}, \hat{h}_{4\Omega}, \ldots \hat{h}_{(L/2-1)2\Omega})$ and A is an M×(L/2) matrix having entries defined $$a_{m,j} = \frac{1}{L}\frac{1-\omega^{-Lm/2}}{1-\omega^{2j\Omega-m}} \text{ if } 2j\Omega - m \neq 0 \bmod M,$$

$$\text{and } a_{m,j} = 1 \text{ if } 2j\Omega - m = 0 \bmod M.$$

The complexity of this linear-model interpolation process is low and approximately equal to $2M \log_2 M$.

As will be further described below, the estimates obtained by linear-model interpolation are used to assign power levels to the tones of the joining line. More particularly, we assign power levels $P_0^{join}, P_1^{join}, \ldots, P_{M-1}^{join}$ for the respective tones of the joining line such that if the estimate $\hat{h}_j$, obtained by linear-model interpolation, is used in the preceding process in the CO 102 then the interference in the j-th tone caused by the joining line will exceed a critical level $\hat{I}_j$ only with a negligibly small probability $1-P_{err}$, where $P_{err}$ can be set to an arbitrary small value, such as $10^{-3}$. This technique for assigning power levels $P_0^{join}, P_1^{join}, \ldots, P_{M-1}^{join}$ in to the respective tones of the joining lines allows us to keep the SINRs in the active lines at a high level and so prevents the lines from dropping.

In other embodiments, the particular tones for which estimates are initially obtained for use in linear-model interpolation may be a different group of tones than in the example above. As another example, initial estimates $(\hat{h}_0, \hat{h}_\Omega, \hat{h}_{2\Omega}, \ldots \hat{h}_{(L-1)\Omega})$ may be obtained for tones $0, \Omega, 2\Omega, \ldots, (L-1)\Omega$, $L=M/\Omega$. Numerous alternative subsets of tones may be used to obtain an initial set of estimates from which estimates are derived for all M tones by linear-model interpolation.

Additional details regarding the above-described illustrative process for channel estimation and power setting based on linear-model interpolation will now be provided.

We assume without limitation that the crosstalk channel coefficient estimate at the j-th tone is given by $\hat{h}_j=h_j+z_j$, where $z_j$ is the additive Gaussian noise with zero mean and variance $N_j$, that is, $z_j \sim CN(0, N_j)$. Hence the entries of the vector $\hat{h}_{2\Omega}=(\hat{h}_0, \hat{h}_{2\Omega}, \hat{h}_{4\Omega}, \ldots \hat{h}_{(L/2-1)2\Omega})$ are independent zero mean complex Gaussian random variables with variances $N_0, N_{2\Omega}$, $N_{4\Omega}, \ldots, N_{(L/2-1)2\Omega}$. These measurement error variances may be given. Alternatively, the variances may be computed using physical information from other interfering lines, such as power allocated per tone and crosstalk of the interfering lines into one or more other lines, together with measures of the background noise. As another possible alternative, bounds on the variances may be determined or inferred using the residual error after correcting for the mean, or an alternative construction.

The entries of the vector $h=(h_0, h_1, \ldots, h_{M-1})$ can be represented in the form $$h_j = h_j^{int} + \epsilon_j + u_j,$$

where $u_j$ is the interpolation error and $\epsilon_j$ is the systematic error. The error $u_j$ is equal to zero if all $N_0, N_{2\Omega}, N_{4\Omega}, \ldots, N_{(L/2-1)2\Omega}$ are zeros, that is, if the entries of $\hat{h}_{2\Omega}=(\hat{h}_0, \hat{h}_{2\Omega}, \hat{h}_{(L/2-1)2\Omega})$ are equal to the corresponding entries of the real vector $h=(h_0, h_1, \ldots, h_{M-1})$. In practice the values $N_0, N_{2\Omega}, N_{4\Omega}, \ldots, N_{(L/2-1)2\Omega}$ can typically be made small, but never zero. Moreover, to make the values $N_0, N_{2\Omega}, N_{4\Omega}, \ldots, N_{(L/2-1)2\Omega}$ small, using an error feedback or SNR feedback approach, we have to spend significant time collecting extensive feedback information. The value of the systematic error $\epsilon_j$, depends on the value of $\Omega$, with smaller values of $\Omega$ producing smaller values of $\epsilon_j$, and on the nature of the unknown vector $h=(h_0, h_1, \ldots, h_{M-1})$ itself. For some vectors $h=(h_0, h_1, \ldots, h_{M-1})$ the systematic error is zero or almost zero, and for other vectors $h=(h_0, h_1, \ldots, h_{M-1})$ it can be significant. Below we present numerical results that show that in a DSL system such as that illustrated in FIGS. 1 and 2 the systematic error is relatively small even for very large values of $\Omega$.

Let $V_j$ be the additive background noise in the active line. Let $P_j^{act}$ and $P_j^{join}$ be the powers used in the active and joining lines, respectively. If we use the coefficients $h_j^{int}$ for preceding, then the SINR $S_j$ in the j-th tone of the active line can be estimated by $$S_j = \frac{P_j^{act}}{V_j + P_j^{join}|h_j - h_j^{int}|^2}.$$

In order to maintain the SINR $S_j$ at a suitably high level, we have to keep the interference $I_j = P_j^{join}|h_j - h_j^{int}|^2$ below some critical value $\hat{I}_j$. To do this we estimate the magnitude of the interpolation error $|h_j - h_j^{int}| = |h_j - h_j - \epsilon_1 - u_1| = |\epsilon_j + u_j|$.

It can be shown that the entries of the vector $u=(u_0, u_1, \ldots, u_{M-1})$ are joint zero-mean complex Gaussian random variables with a covariance matrix given by $$\Sigma = \sum_{n=0}^{L/2-1} N_{n \cdot 2\Omega} \Omega^{(n)},$$

where $$\Omega_{m,r}^{(n)} = \frac{1}{(L/2)^2} \frac{1-\omega^{mL/2}}{1-\omega^{m-2n\Omega}} \frac{1-\omega^{-rL/2}}{1-\omega^{2n\Omega-r}}$$

and $\omega$ denotes a complex root of unity, and both fractions are defined to be $L/2$ if either denominator is zero. The values $N_0, N_{2\Omega}, N_{4\Omega}, \ldots, N_{(L/2-1)2\Omega}$ are known or at least bounded, and so we can compute the corresponding covariance matrix $\Sigma$. The variance of $u_j$ is equal to the diagonal term $\Sigma_{j,j}$.

Accordingly, the following approach may be used for estimation of the systematic error. First we compute the values $\hat{\epsilon}_j = \hat{h}_j - h_j^{int} = \epsilon_j + z_j - u_j$ at tones $\Omega, 3\Omega, \ldots, \Omega+(L/2-1) \cdot 2\Omega$. It can be seen that $z_j - u_j$ is a zero-mean complex Gaussian random variable with the variance $$W_j = \Sigma_{j,j} + N_j.$$

Let $p_{a,W}(x)$ be the probability density function (PDF) of the random variable $x \sim CN(a,W)$. Let $$J(a, W, R) = \int_{C(R)} p_{a,W}(x) dx$$

where $C(R)$ is the circle of radius $R$ centered at the origin.

For an observed value $\hat{\epsilon}_j = \hat{h}_j - h_j^{int} = \epsilon_j + z_j - u_j$ and given probability $P_{syst.err}$ which can be chosen to be very small, for example $P_{syst.err}=10^{-6}$, we would like to find a critical value of systemic error, given by random variable $\epsilon_j^{cr}$, such that $$Pr(|\epsilon_j| > \epsilon^{cr}) \leq P_{syst.err}$$

This can be achieved by recognizing that if $\epsilon_j^{cr}$ is the smallest value such that $J(\hat{\epsilon}_j, W_j, \epsilon_j^{cr}) \geq 1-P_{syst.err}$, then $Pr(|\epsilon_j| > \epsilon^{cr}) \leq P_{syst.err}$. Alternative constructions may also be used in specifying this confidence interval on the magnitude of the true crosstalk.

As indicated previously, we would like to set the power level $P_j^{join}$ at the highest possible level while ensuring that the SINR value $S_j$ does not fall below a certain value. Based on the above, this can be done as follows:

1. Fix a reliability value for systematic error, e.g., $P_{syst.err}=10^{-6}$, and for interpolation error, e.g., $P_{int.err}=10^{-6}$.
2. Compute $h^{int}=A_{2\Omega}\hat{h}_{2\Omega}$.
3. At tones $j \in \{\Omega, 3\Omega, \ldots, \Omega+(L/2-1) \cdot 2\Omega\}$ find $\epsilon_j^{cr}$ in the manner described above.
4. For $(2t-1)\Omega < j < (2t+1)\Omega$, $t \geq 1$, assign $\epsilon_j^{cr} = (\epsilon_{(2t-1)\Omega}^{cr} + \epsilon_{(2t+1)\Omega}^{cr})/2$.
5. Compute $h^{int}=A_\Omega \hat{h}_\Omega$, where $\hat{h}_\Omega = (\hat{h}_0, \hat{h}_\Omega, \hat{h}_{2\Omega}, \ldots \hat{h}_{(L-1)\Omega})$ and $A_\Omega$ implements a finer spacing than $A_{2\Omega}$. Thus, in this version of the algorithm, we start with a coarser spacing given by $A_{2\Omega}$ and then determine if a finer spacing given by $A_\Omega$ is required to obtain an acceptable level of systematic error.
6. For $j \in \{0, \Omega, 2\Omega, \ldots, (L-1)\Omega\}$ assign $\epsilon_j^{cr}=0$. This is because the systematic error is zero at the interpolation points $\{0, \Omega, 2\Omega, \ldots, (L-1)\}$.
7. For each $0 \leq j \leq M-1$ compute $e_j$ such that $J(\hat{\epsilon}_j^{cr}, \Sigma_{j,j}, R_j) \geq 1-P_{int.err}$. If in the joining line the power $P_j^{join}$ is used, then with probability $1-2P_{syst.err}-P_{int.err}$ the SINR in the active line will be $$S_j \geq \frac{P_j^{act}}{V_j + P_j^{join} e_j^2}.$$

8. To keep the SINR at the level $S_j^{cr}$ we assign $$P_j^{join} \geq \left(\frac{P_j^{act}}{S_j^{cr}} - V_j\right) / e_j^2.$$

It is to be appreciated that the above process for obtaining channel estimates and setting power levels for tones of the joining line is presented by way of illustration only, and other techniques may be used in other embodiments. For example, in other embodiments, crosstalk coefficient estimates for both upstream and downstream tones may be used for interpolation either for the downstream alone, the upstream alone or both the upstream and downstream together. Also, alternative embodiments may utilize measures of absolute crosstalk rather than relative crosstalk. Furthermore, the operation at step 4 of the above process reflects only one possible technique of compensating for systematic error. Alternative embodiments may implement systematic error bounds using splines or other techniques based on empirical crosstalk data, physical considerations, or both.

A numerical example of the above-described coefficient estimation and power setting process will now be described with reference to FIGS. 4A and 4B. In this example, it is again assumed that there are two lines, an active line and a joining line, and further that M=2048 and $\Omega$=128, such that L=M/$\Omega$=16. Accordingly, we utilize in this example estimates of a subset of 32 of the crosstalk channel coefficients for obtaining estimates for all M crosstalk channel coefficients. It is also assumed that the background additive noise $N_j$ is the same in all tones and that $N_j$ is 20 dB smaller than an average crosstalk channel coefficient between the active and joining line such that use of precoding can provide a significant gain. It is further assumed that K=256 symbols are used for error feedback measurements. This means that we need only about 1/16 of a second to perform the interpolation and assign appropriate power levels to all of the tones of the joining line.

Figure 4A:
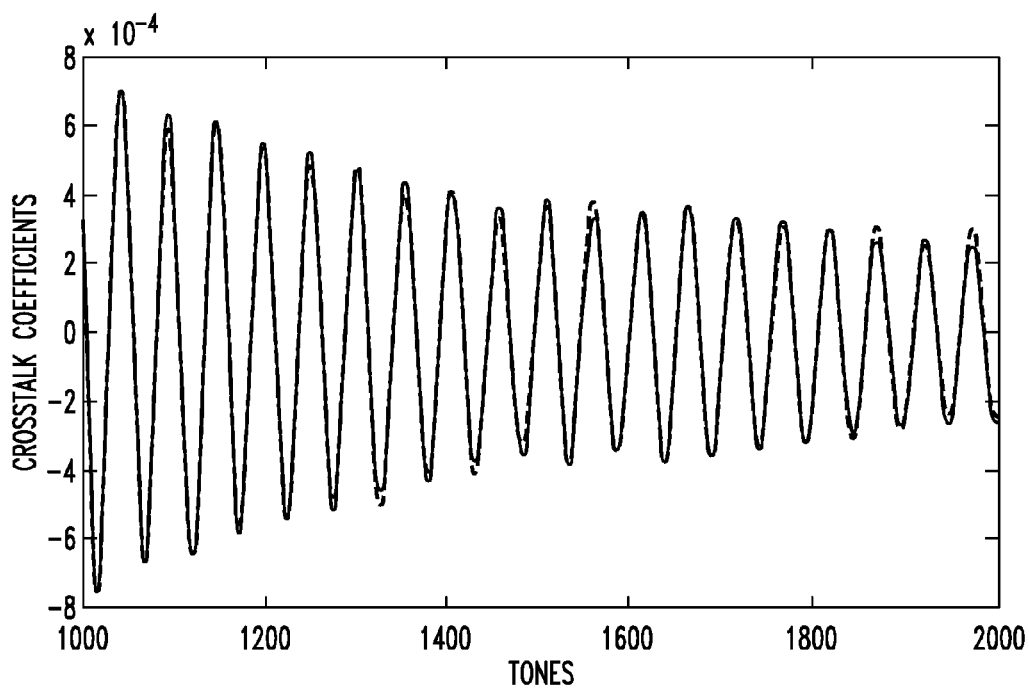
FIG. 4A shows plots comparing a given set of crosstalk coefficients with corresponding estimates obtained using an exemplary linear-model interpolation technique in an illustrative embodiment of the invention.

FIG. 4A shows the crosstalk channel coefficients and their corresponding estimates obtained via the linear-model interpolation approach. There are two superimposed plots shown, one for which the y-axis represents the real part of $h_j$ and the other for which the y-axis represents real part of $\hat{h}_j^{int}$. The results for the imaginary parts are similar but not shown. It is apparent from the close agreement between the two superimposed plots that even though the value $\Omega$=128 used in this example is quite large, the estimation error is quite small. Other large values of $\Omega$ have been similarly observed to give satisfactory reduction of systematic error in other experiments we have performed, further illustrating the utility of this approach. Reducing the value of $\Omega$ relative to a large value such as that specified above generally resulted in little additional gain in SINR.

Power levels were computed for all 2048 tones of the joining line using the illustrative process described above. The power levels were computed such that if the estimate $h_j^{int}$ obtained by linear-model interpolation is used in the precoder 202, then the interference in the j-th tone caused by the joining line with high probability will not exceed the level of the background additive noise $\hat{I}_j = N_j$.

Figure 4B:
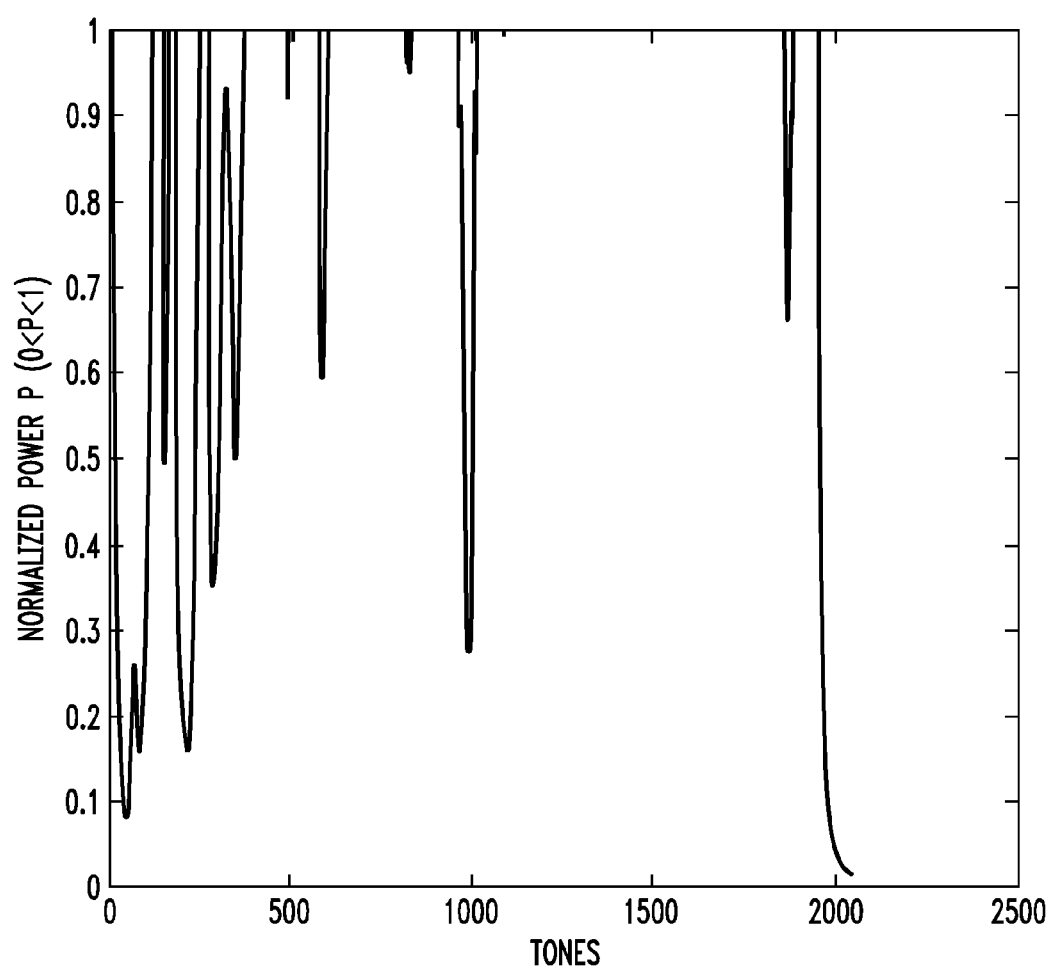
FIG. 4B is a plot showing normalized power levels determined using the crosstalk coefficient estimates of FIG. 4A.

FIG. 4B shows the assigned power levels $P_0^{join}, P_1^{int}, \ldots, P_{M-1}^{join}$ normalized such that $0 < P_j^{join} < 1$. For approximately 1870 or the 2048 tones, or 91% of all tones, the normalized assigned power levels exceed 0.5. Thus in 91% of the tones we lose less than 3 dB. In about 1600 of the 2048 tones, or 78% of all tones, the normalized assigned power levels are at the maximum value 1.

In the illustrative embodiment of FIG. 3 the joining line and the active lines are all associated with the same CO 102. However, in other embodiments, these lines may be distributed across multiple COs. FIG. 5 shows an example of an arrangement of this type. A multi-channel communication system 500 comprises a first CO 502-1 and a second CO 502-2, also denoted CO 1 and CO 2, respectively. The CPE 104-1, 104-2, 104-3, and possibly others, are served by CO 502-1, while CPE 104-N, and possibly others, are served by CO 502-2. As in the example of FIG. 3, line 106-N is joining an active group that comprises lines 1 through N−1. The interference created in the active lines due to crosstalk from the joining line is indicated generally at 504.

The two COs in the FIG. 5 embodiment may be from different vendors. For example, it is well known that in conventional systems, several COs of distinct vendors can be connected to the same bundle of DSL lines. Under these and other conditions, the various COs may have to interact with one another in order to achieve optimal interference cancellation. In the present embodiment, CO 1 estimates the crosstalk coefficients $h_j$, j=0, ..., M−1, from the joining line N of CO 2. CO 1 also passes to CO 2 via connection 510 information specifying the maximum levels of powers $P_j^{join}$, j=0, ..., M−1, that can be used in the joining line of CO 2 that would not cause dropping of any of the active lines 1 through N−1. The process of estimation of $h_j$, j=0, ..., M−1, and determination of $P_j^{join}$, j=0, ..., M−1, should be very fast to prevent long joining delays in CO 2, and may be implemented using Steps 1 through 8 as described previously. It may be beneficial for this interaction to be standardized so as to minimize delays for COs produced by different vendors.

It should be noted that the two COs in the FIG. 5 embodiment may be viewed as comprising a single access node. Alternatively, each such central office may be viewed as a separate access node.

A given embodiment of the invention may be configured such that the CPE 104 of the active lines are informed by the CO 102 that they should expect strong interference at the various tones used to obtain estimates, such as tones 0, $2\Omega$, $4\Omega$, ..., $(L/2-1)2\Omega$ or tones 0, $\Omega$, $2\Omega$, ..., $(L-1)\Omega$. The information about strong interference at particular tones will allow decoders of error correcting codes used in the active lines to treat those tones as erasures rather than errors. The error correcting codes may comprise Reed Solomon (RS) codes, convolutional codes or other codes, in any combination. It is well known that a code of an error correcting code can generally correct two times more erasures than errors. More particularly, a given error correcting code having a minimum Hamming distance d can generally correct d−1 erasures and (d−1)/2 errors.

Advantageously, use of the techniques described herein allows a significantly speed up in the process of estimating crosstalk channel coefficients. Estimates obtained in this manner facilitate the process of safe line joining without creating significant interference to other lines. For example, in the DSL context the channel coefficient estimates will allow one to efficiently precode active DSL lines against interference created by a joining line with only a short delay, while also maintaining desired SINRs on the active lines so as to prevent the active lines from dropping. The disclosed techniques for estimating channel coefficients are also useful in a wide variety of other data signal control processes.

As mentioned above, the illustrative embodiments assume the use or an error feedback or SNR feedback approach to channel coefficient estimation. However, the techniques of the invention can be adapted in a straightforward manner to embodiments that do not utilize error feedback or SNR feedback.

Alternative embodiments of the invention can identify the particular tones used for interpolation based on knowledge of the current channel conditions or forward error correcting code of the active lines. For example, the Reed-Solomon codes typically used in DSL systems give protection against impulsive noise in a limited band, i.e., affecting a small number of tones. Therefore, given knowledge of the current channel conditions and the code being used, one can determine an appropriate progression or "puncturing" of tones for the interpolation process. For example, the tones that are punctured in the interpolation process may be based on advance knowledge of where code erasures will appear. This would allow decoding with fewer errors, provided the decoder is informed, such that more puncturing may be done than one would otherwise expect. Accordingly, these alternative embodiments may implement linear-model interpolation using a tone puncturing approach that is guided by knowledge of current channel conditions and error correcting codes.

Embodiments of the present invention may be implemented at least in part in the form of one or more software programs that are stored in a memory or other processor-readable medium of CO 102 or CPE 104 of system 100. Such programs may be retrieved and executed by a processor in the CO or CPE. The controller 200 may be viewed as an example of such a processor. Of course, numerous alternative arrangements of hardware, software or firmware in any combination may be utilized in implementing these and other systems elements in accordance with the invention. For example, embodiments of the present invention may be implemented in a DSL chip or other similar integrated circuit device.

It should again be emphasized that the embodiments described above are presented by way of illustrative example only. Other embodiments may use different communication system configurations, CO and CPE configurations, communication channels, crosstalk estimate generation and crosstalk control process steps, depending on the needs of the particular communication application. Alternative embodiments may therefore utilize the techniques described herein in other contexts in which it is desirable to quickly obtain crosstalk coefficients for at least a subset of tones.

In the illustrative embodiment of FIG. 2, it is assumed that all of the lines are subject to precoding. However, other embodiments need not be so configured, and one or more lines may not have associated precoding. In an arrangement of this type, the disclosed techniques may be used to measure how much crosstalk would be caused in non-precoded active lines, and a determination may then be made to reduce the power level on certain tones that are giving rise to this interference.

It should also be noted that the particular assumptions made in the context of describing the illustrative embodiments should not be construed as requirements of the invention. The invention can be implemented in other embodiments in which these particular assumptions do not apply.

These and numerous other alternative embodiments within the scope of the appended claims will be readily apparent to those skilled in the art.

What is claimed is:

1. A method for use in a communication system comprising a plurality of transmitters and at least one receiver, the method comprising the steps of:
    obtaining estimated crosstalk coefficients between a joining channel and an active channel of the system; and
    setting a power level of at least one signal transmitted over the joining channel based on the estimated crosstalk coefficients;
    wherein the obtaining step comprises first obtaining a subset of the estimated crosstalk coefficients and subsequently determining additional ones of the estimated crosstalk coefficients by applying an interpolation process to the estimated crosstalk coefficients in the subset; and
    wherein the setting step comprises setting the power level of the signal transmitted over the joining channel in a manner that ensures maintenance of a desired performance characteristic for the active channel.

2. The method of claim 1 wherein the system comprises a DSL system in which the active channel and the joining channel comprise respective active and joining lines each comprising M tones.

3. The method of claim 2 wherein the subset of estimated crosstalk coefficients comprises crosstalk coefficients for a subset $\{0, 2\Omega, 4\Omega, \ldots, (L/2-1)2\Omega\}$ of the M tones, where $L=M/\Omega$, the subset thereby providing a vector of estimated crosstalk coefficients given by $\hat{h}_{2\Omega}=(\hat{h}_0, \hat{h}_{2\Omega}, \hat{h}_{4\Omega}, \ldots \hat{h}_{(L/2-1)2\Omega})$.

4. The method of claim 2 wherein the subset of estimated crosstalk coefficients comprises crosstalk coefficients for a subset $\{0, \Omega, 2\Omega, \ldots, (L-1)\Omega\}$ of the M tones, where $L=M/\Omega$, the subset thereby providing a vector of estimated crosstalk coefficients given by $\hat{h}_\Omega=(\hat{h}_0, \hat{h}_\Omega, \hat{h}_{2\Omega}, \ldots \hat{h}_{(L-1)\Omega})$.

5. The method of claim 3 wherein the interpolation process comprises a linear-model interpolation process.

6. The method of claim 5 wherein linear-model interpolation process applied to the subset of the estimated crosstalk coefficients to obtain the additional ones of the estimated crosstalk coefficients is given by:

$$h^{int}=A_{2\Omega}\hat{h}_{2\Omega},$$

where $h^{int}=(h_0^{int}, h_1^{int}, \ldots, h_{M-1}^{int})$ is a vector comprising the estimated crosstalk coefficients for respective ones of the M tones, $\hat{h}_{2\Omega}=(\hat{h}_0, \hat{h}_{2\Omega}, h_{4\Omega}, \ldots \hat{h}_{(L/2-1)2\Omega})$ is the vector of estimated crosstalk coefficients in the subset, and $A_{2\Omega}$ is an $M\times(L/2)$ matrix.

7. The method of claim 6 wherein the matrix $A_{2\Omega}$ has entries $a_{m,j}$ given by:

$$a_{m,j} = \frac{1}{L}\frac{1-\omega^{Lm/2}}{1-\omega^{2j\Omega-m}} \text{ if } 2j\Omega - m \neq 0\bmod M,$$

$$\text{and } a_{m,j} = 1 \text{ if } 2j\Omega - m = 0\bmod M,$$

where $\omega$ denotes a complex root of unity.

8. The method of claim 2 wherein the step of setting a power level based on the estimated crosstalk coefficients comprises assigning power levels $P_0^{join}, P_1^{join}, \ldots, P_{M-1}^{join}$ to respective ones of M tones of the joining line.

9. The method of claim 8 wherein the power levels are assigned to the tones of the joining line such that if a given one of the estimated crosstalk coefficients $\hat{h}_j$ obtained by application of the interpolation process is utilized for precoding of the active line then interference in the j-th tone of the active line from the joining line will exceed a designated level only with a negligibly small probability.

10. The method of claim 2 wherein the desired performance characteristic for the active line comprises SINRs for respective tones of the active line.

11. The method of claim 3 wherein the step of setting a power level based on the estimated crosstalk coefficients comprises the steps of:
    determining a critical value $\epsilon_j^{cr}$ of systematic error for tones $j \in \{\Omega, 3\Omega, \ldots, \Omega+(L/2-1)2\Omega\}$;
    for $(2t-1)\Omega<j<(2t+1)\Omega$, $t\geq 1$, assigning $\epsilon_j^{cr}=(\epsilon_{(2t-1)\Omega}^{cr}+\epsilon_{(2t+1)\Omega}^{cr})/2$;
    computing $h^{int}=A_\Omega\hat{h}_\Omega$, where $\hat{h}_\Omega=(\hat{h}_0, \hat{h}_\Omega, \hat{h}_{2\Omega}, \ldots \hat{h}_{(L-1)\Omega})$;
    for $j \in \{0, \Omega, 2\Omega, \ldots, (L-1)\Omega\}$ assigning $\epsilon_j^{cr}=0$;
    for each $0\leq j\leq M-1$ computing $e_j$ such that $J(\hat{\epsilon}_j^{cr}, \Sigma_{j,j}, R_j)\geq 1-P_{int.err}$; and assigning $$P_j^{join} \geq \left(\frac{P_j^{act}}{S_j^{cr}} - V_j\right) / e_j^2;$$

where $$J(a, W, R) = \int_{C(R)} p_{a,W}(x) dx;$$

where C(R) is a circle of radius R centered at the origin;
where $P_{a,W}(x)$ is a probability density function of a random variable x~CN(a,W); and
where $V_j$ is the additive background noise in the j-th tone of the active line, $P_j^{act}$ and $P_j^{join}$ are the powers used in the j-th tones of the active and joining lines, respectively, and $S_j^{cr}$ is a critical SINR value of in the j-th tone of the active line.

12. The method of claim 1 further comprising the step of adjusting precoder coefficients applied to signals sent by the transmitters to respective receivers over respective channels of the system based on the estimated crosstalk coefficients.

13. The method of claim 1 wherein the step of estimating crosstalk coefficients comprises processing at least one of error samples and SNR measurements fed back from one or more receivers of the system.

14. The method of claim 2 wherein particular ones of the M tones to be utilized for determining the estimated crosstalk coefficients for use in the interpolation process are determined at least in part based on knowledge of current channel conditions and error correcting codes of one or more active lines.

15. A non-transitory computer-readable storage medium having embodied therein executable program code that when executed by a processor of an access node of the system causes the access node to perform the steps of the method of claim 1.

16. An apparatus comprising:
an access node comprising a plurality of transmitters adapted for communication with at least one receiver over a plurality of channels;
the access node being operative to obtain estimated crosstalk coefficients between a joining one of the channels and an active one of the channels, and to set a power level of at least one signal transmitted over the joining channel based on the estimated crosstalk coefficients;
wherein the access node obtains the estimated crosstalk coefficients by first obtaining a subset of the estimated crosstalk coefficients and subsequently determining additional ones of the estimated crosstalk coefficients by applying an interpolation process to the estimated crosstalk coefficients in the subset; and
wherein the access node sets the power level of the signal transmitted over the joining channel in a manner that ensures maintenance of a desired performance characteristic for the active channel.

17. The method of claim 16 wherein the subset of estimated crosstalk coefficients comprises crosstalk coefficients for a subset $\{0, 2\Omega, 4\Omega, \ldots, (L/2-1)2\Omega\}$ of M tones of the joining channel, where $L=M/\Omega$, the subset thereby providing a vector of estimated crosstalk coefficients given by $\hat{h}_{2\Omega}=(\hat{h}_0, \hat{h}_{2\Omega}, \hat{h}_{4\Omega}, \ldots \hat{h}_{(L/2-1)2\Omega})$.

18. The apparatus of claim 16 wherein the access node comprises a processor coupled to a memory with the processor being configured to control said estimation of crosstalk coefficients and set setting of the power level of the signal transmitted over the joining channel in accordance with executable program code stored in said memory.

19. The apparatus of claim 16 wherein the access node comprises at least a portion of at least one central office of a DSL system.

20. A communication system comprising:
a plurality of transmitters; and
a plurality of receivers;
wherein the transmitters are adapted for communication with respective ones of the receivers over respective channels;
the system being operative to obtain estimated crosstalk coefficients between a joining channel and an active channel, and to set a power level of at least one signal transmitted over the joining channel based on the estimated crosstalk coefficients;
wherein the crosstalk coefficients are obtained by first obtaining a subset of the estimated crosstalk coefficients and subsequently determining additional ones of the estimated crosstalk coefficients by applying an interpolation process to the estimated crosstalk coefficients in the subset; and
wherein the power level of the signal transmitted over the joining channel is set in a manner that ensures maintenance of a desired performance characteristic for the active channel.

21. The method of claim 20 wherein the subset of estimated crosstalk coefficients comprises crosstalk coefficients for a subset $\{0, 2\Omega, 4\Omega, \ldots, (L/2-1)2\Omega\}$ of M tones of the joining channel, where $L=M/\Omega$, the subset thereby providing a vector of estimated crosstalk coefficients given by $\hat{h}_{2\Omega}=(\hat{h}_0, \hat{h}_{2\Omega}, \hat{h}_{4\Omega}, \ldots \hat{h}_{(L/2-1)2\Omega})$.

* * * * *

UNITED STATES PATENT AND TRADEMARK OFFICE
CERTIFICATE OF CORRECTION

PATENT NO. : 8,498,408 B2  Page 1 of 1
APPLICATION NO. : 12/493328
DATED : July 30, 2013
INVENTOR(S) : Alexei E. Ashikhmin et al.

It is certified that error appears in the above-identified patent and that said Letters Patent is hereby corrected as shown below:

In the Claims:

Claim 4, col. 14, line 13. Please replace the second occurrence of "Ω" in the set with --2Ω--.

Claim 7, col. 14, line 34. Please replace the expression $\dfrac{1}{L}\dfrac{1-\omega^{Lm/2}}{1-\omega^{2j\Omega-m}}$ with the expression shown below.

$$\dfrac{1}{L}\dfrac{1-\omega^{-Lm/2}}{1-\omega^{2j\Omega-m}}$$

Signed and Sealed this
Tenth Day of September, 2013

Teresa Stanek Rea
*Acting Director of the United States Patent and Trademark Office*